United States Patent [19]

Strieter

[11] Patent Number: 5,320,446
[45] Date of Patent: Jun. 14, 1994

[54] WILD ANIMAL HIGHWAY WARNING REFLECTOR

[76] Inventor: John R. Strieter, 3918 Fourteenth St., Rock Island, Ill. 61201

[21] Appl. No.: 125,595

[22] Filed: Sep. 23, 1993

Related U.S. Application Data

[62] Division of Ser. No. 946,941, Sep. 17, 1992, Pat. No. 5,277,516.

[51] Int. Cl.$^5$ .............. E01F 9/10; G09F 13/16
[52] U.S. Cl. .............................. 404/14; 404/9; 359/552
[58] Field of Search ............... 40/903; 359/527, 534, 359/542, 547, 552; 362/308, 309, 364; 404/9, 14

[56] References Cited

U.S. PATENT DOCUMENTS

| | | | |
|---|---|---|---|
| 2,318,722 | 5/1943 | Smith et al. | 404/9 X |
| 3,814,500 | 6/1974 | Ebenbichler | 404/10 X |
| 3,965,596 | 6/1976 | Schröcksnadel | 404/9 X |
| 4,252,409 | 2/1981 | Schwab | 404/14 X |
| 4,406,045 | 9/1983 | Schwab | 29/527.2 |

Primary Examiner—Thuy M. Bui
Assistant Examiner—James A. Lisehora

[57] ABSTRACT

This invention describes the design and method of installation of wild animal highway warning reflectors. The reflector consists of a transparent plate having a flat light entrance surface and a backside reflection surface from which the reflected light is dispersed. The rear surface is comprised of many reflecting toric surfaces arranged vertically and horizontally side-by-side. The new design of the toric surfaces and the unique method of installing the reflectors provide complete reflected light coverage for all variations of roadside terrain to warn wild animals that wish to cross a highway at night. To an animal each reflector glitters with colored light. As a vehicle passes, animals see an unnatural, sequence of lights coming from a plurality of reflectors located along both sides of the highway. Installation of these warning reflectors adjacent to highways where wild animals frequently cross has led to a considerable reduction of the number of accidents.

4 Claims, 4 Drawing Sheets

WILD ANIMAL HIGHWAY WARNING REFLECTOR

This is a divisional of copending application Ser. No. 07/946,941 filed on Sep. 17, 1992 now U.S. Pat. No. 5,277,516 issued Jan. 11, 1994.

BACKGROUND

1. Field of Invention

This invention pertains to a highway reflector designed and positioned to warn wild animals of approaching vehicles. Properly located warning reflectors are optical means particularly intended to avoid traffic accidents between moving vehicles and wild animals at night. Many serious accidents occur near forested areas when animals such as deer are struck by fast-moving vehicles while crossing unlit highways during night time hours.

2. Description of Prior Art

In U.S. Pat. No. 3,814,500 a deer warning reflector is described consisting basically of a prism plate which is sealed in a housing so that it is watertight. The erection of these warning reflectors for deer have led to a considerable reduction of the number of accidents. These reflectors work on the principle of diverting the light rays from oncoming vehicles by means of internal reflection off of a planar prism. The top surface is curved to disperse the light. These warning reflectors have the disadvantage of consisting of several individual parts which give rise to high production and assembly costs. They also do not allow for variation in light ray reception and reflection by simple adjustment of the optical elements.

In U.S. Pat. No. 4,406,045, a division of U.S. Pat. No.4,252,409, another warning deer reflector is described. This reflector has also been shown to be effective in reducing accidents. It is similar to the invention described here in that it consists of transparent plates with certain kinds of toric surfaces. However, to achieve adequate roadside light coverage, two distinctly different types of these reflectors are required, one for flat terrain and another for hilly terrain. This makes manufacturing and installation more complicated and costly because the hilly terrain reflectors have a relatively small horizontal light coverage and need to be installed very close together to be effective. Also, the reflectors are to be installed adjacent to and directed away from the highway rather than directed across the highway. As described below, there are very important advantages to installing warning reflectors with particular reflecting characteristics to direct reflected light across the highway.

OBJECTS AND ADVANTAGES

The object of this invention is to provide a single, multi-purpose warning reflector which is of simple design, easy to install, resistant to weather, and appropriately located to provide better light coverage and thereby more effective warning to wild animals that are on the verge of crossing the highway at night.

This invention is based on the knowledge that this objective can be achieved by means of a warning reflector, the rear reflection surface of which consists of many toric surfaces arranged vertically and horizontally side-by-side. A toric surface is a surface of revolution shaped like a barrel. It is generated by rotating a circle about a non-intersecting coplanar line as axis.

This invention is a warning reflector composed of two transparent plates. Each plate has a flat light-entrance surface and a reflective layer on the rear surface of the plate. Light from headlights is dispersed by means of many identical curved surface portions defining the rear surface and arranged vertically and horizontally side-by-side. The reflector plate is characterized by the fact that the curved surface portions of the rear surface are arranged opposite the light-entrance surface and comprise toric surfaces which support the reflective layer.

The invention further comprises a method of manufacturing a warning reflector wherein a highly reflective metal sheet or foil is inserted into an injection mold and transparent plastic material is injected into the mold compressing the foil and thus causing the foil to conform to the curved surfaces.

The warning reflectors made in accordance with the invention are very simple to construct. In particular, the warning reflector can be embodied in a one-piece construction and is resistant to external influences such as weather and soil. The entering light is reflected in a punctiform manner from the individual toric surfaces. By virtue of the arrangement of several side-by-side toric surfaces the illumination of the total surface can be achieved and thus a high optical efficiency can be guaranteed.

DRAWING FIGURES

DESCRIPTION—FIGS. 1 TO 8

Figure 1:
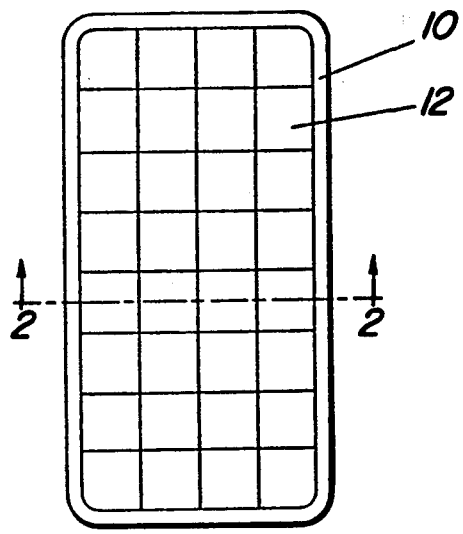
FIG. 1 is a schematic front view of one of the reflector plates. Each square represents a toric surface.

FIG. 1 shows the front view of one side of the two-plate warning reflector. It comprises of a transparent plate 10. Modified PMMA, acrylic glasses or plastics, cellulose esters as well as cellulose acetates, cellulose acetobutyrates, polycarbonates, and polystyrols are all suitable materials.

The dimensions of each plate depend basically on the color of the transparent plate 10, the selected division, and the desired dispersion of the reflected light. In general, the thickness of a plate is between 2 and 5 mm. Because of light absorption the plates are made as thin as possible.

The size of the plates can be selected as desired. As they are affixed to highway posts, they are usually the shape of a rectangle having a height ranging from 5 to 30 cm and a width ranging from 3 to 10 cm.

The division of the warning reflector into individual toric surfaces 12 can be extensively varied. The division depends on the desired dispersion, on the radii of the toric surfaces, and on the index of refraction of the plastic. By way of example, 3 to 20 toric surfaces 12 may be arranged side-by-side in the horizontal direction and 5 to 40 in the vertical direction.

Figure 2:
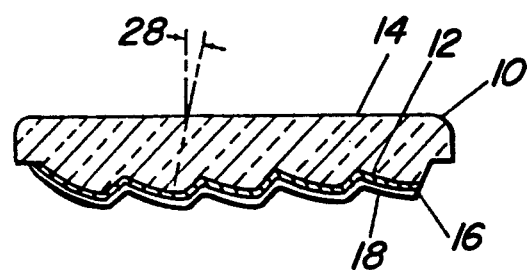
FIG. 2 is a cross-sectional view of FIG. 1 along the line A—A.

FIG. 2 shows that each reflector consists of several individual surfaces. The plate 10 includes a reflective foil 16 on the side opposite of the light entrance surface 14. The reflective layer is normally a metal foil, e.g., an aluminum or silver foil. The reflective foil 16 may comprise of an aluminum foil which may be coated with plastic on one or both sides and molded in a suitable manner with the plate 10. To protect the reflective layer, a suitable protective layer 18, e.g., a lacquer layer, may be provided.

The plastic plate 10 may be colored, e.g., red, yellow, white, blue or green. According to the opinions of behavioral research scientists, wild animals such as deer respond particularly well to these colors in reflector devices of this type.

Figure 3:
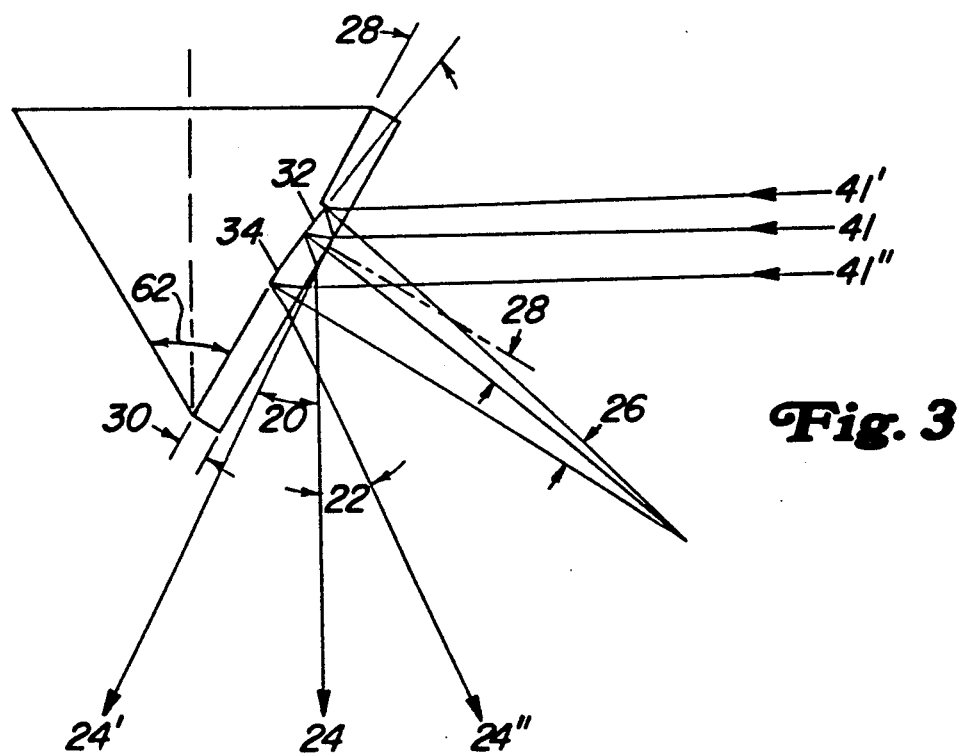
FIG. 3 is a schematic cross-sectional view of the edge of one toric reflecting plate.

FIG. 3 illustrates how three representative light rays 41 coming from a vehicle's headlights reflect off of a particular toric surface. There is an angular dispersion 20 to the left and an angular dispersion 22 to the right of a line 24 perpendicular to the highway. Detailed analysis using geometry, Snell's law, and the law of reflection provides the following results.

To obtain an angular dispersion so that 20 and 22 are each about 27°, one may use a radius of curvature 26 of 7 cm, the angle of the optic axis 28 of 8.4°, a plate thickness 30 of 4 mm, an index of refraction of the plastic of 1.43, arc length 32 of 0.43 cm, and arc length 34 of 0.87 cm. This means that the square area needed for each toric surface 10 is 1.3 cm × 1.3 cm.

Figure 4:
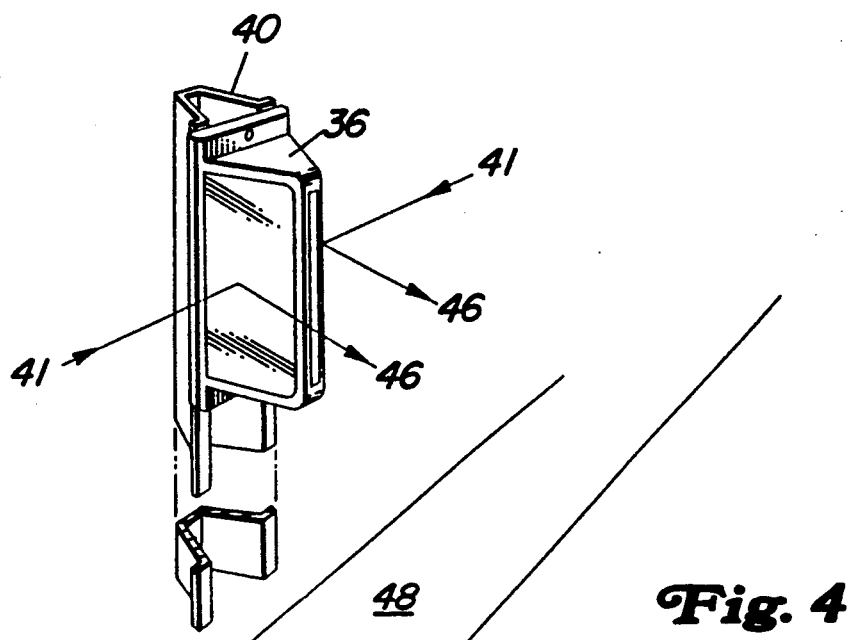
FIG. 4 shows a warning reflector mounted on a highway post. It shows how light coming from either direction along the highway reflects to the side of the highway.

FIG. 4 illustrates in perspective a warning reflector 36 attached to a highway post 40. Also, the direction of the reflected light 46 from a motor vehicle approaching each of the two sides is shown for the central beam 41 incoming from the headlights.

Figure 5:
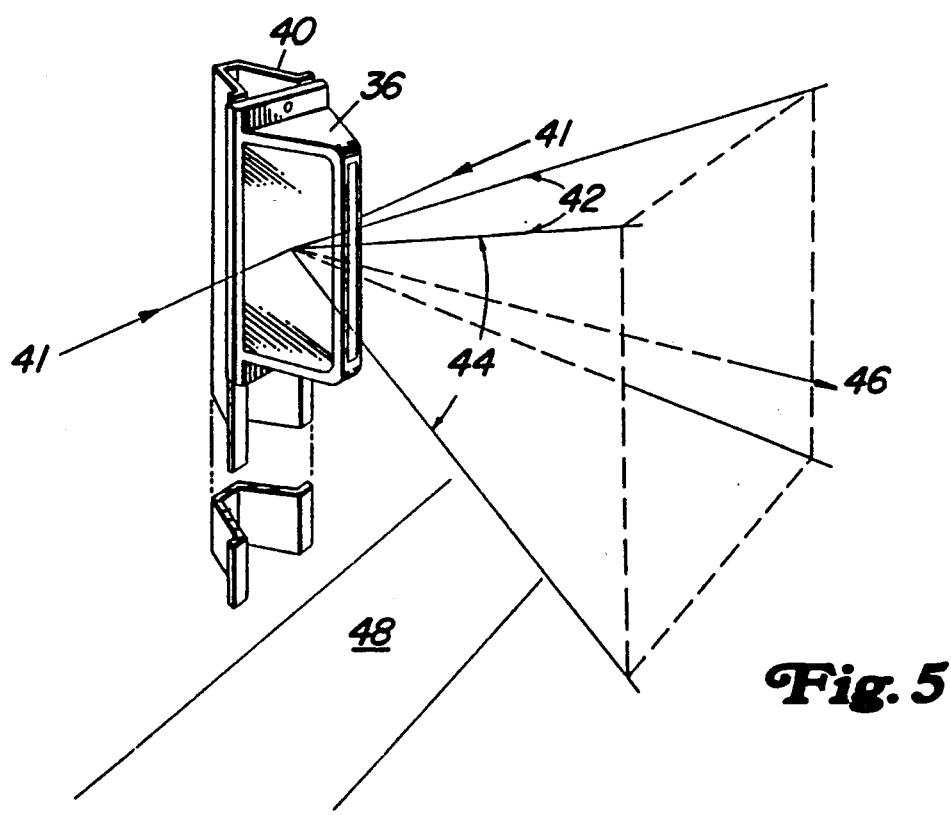
FIG. 5 shows the extent of the angular dispersion of light rays from either surface of the warning reflector.

In FIG. 5 the spreading of the light is shown schematically. The dispersion of light in the horizontal direction 42 and vertical direction 44 is about 54°, the result that is obtained when using the values of the toric surface as listed above. The horizontal dispersion is ±27° from line 46 and the vertical dispersion is ±27° from line 46. Other angular dispersion values may be obtained by making small changes in the shape and size of the toric surfaces.

Figure 6:
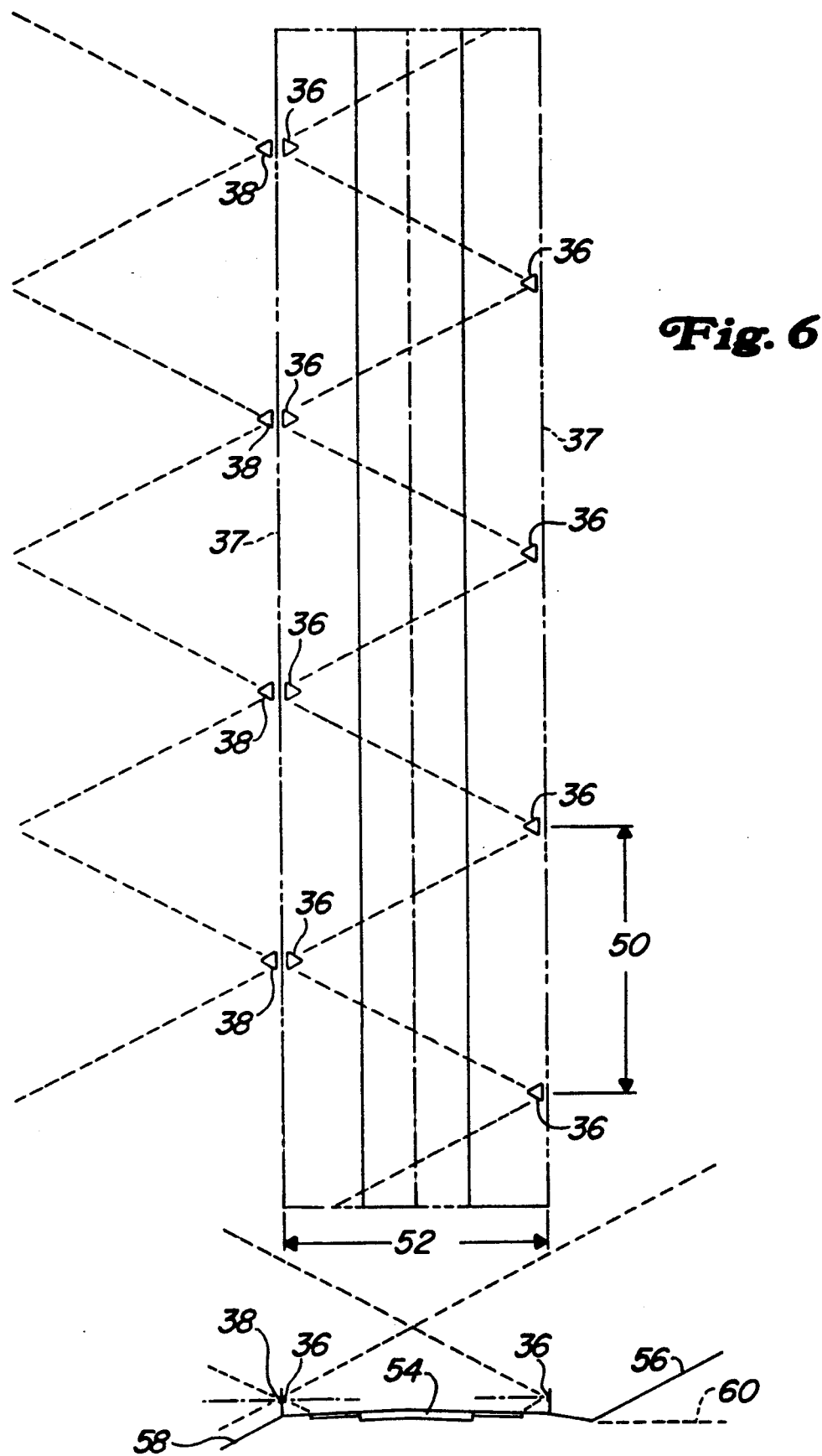
FIG. 6 shows the viewing coverage and roadside illumination by means of warning reflectors on the opposite sides of the highway in a staggered configuration.

The illumination of the area affected when the main direction of the reflection is perpendicular to the highway 48 is shown in FIG. 6. It shows that complete coverage of the highway and roadsides is obtained by having the equally staggered reflectors 36 positioned to direct light across the highway. As the prior art illustrates, rows of reflectors on each side of the highway directing light away from the highway do not provide complete coverage. There are blind spots on the roadsides between the reflectors and no light illuminating the highway area.

As shown in FIG. 6, the reflectors 36 are located along the highway at equal intervals staggered oppositely from each other. The size of the interval 50 is equal to the distance 52 between the two rows of reflectors along each side of the highway. The lines of the two rows of reflectors 37 may be symmetrical with the highway. The highway may be single lanes or a plurality of lanes, two-way or dual configuration. The lines of reflectors 37 may be offset from the highway edges up to approximately 60 feet, depending upon the overall width of the two-way or the dual highway. The typical cut hillside highway cross section 54 illustrates the complete light coverage provided by the reflectors for cut 56, fill 58, and level 60 terrain.

To provide coverage of down slope embankments in areas of roadside fills, additional reflectors 38 directing light away from the highway are positioned back to back with the reflectors 36 at or near the shoulder break.

For the purpose of mounting, the plates may be enclosed in a housing, e.g., made of plastic, and this housing may be attached to the highway post.

It is preferred to construct the warning reflectors in a single piece. The reflector then consists of only two plates arranged at an angle to each other and a suitable attaching means for mounting on the post. The advantages of the one-piece construction lie in the fact that its manufacture is simple, the costs of production are low, and it is easy to install and clean.

The warning reflectors 36 and 38 consist of two plates arranged at an angle 62 of approximately 60° and contained in one piece. Their manufacture may be carried out by injection molding. Alternatively, the plates may be manufactured in a suitable die in which they are shaped by pressure.

Figure 7:
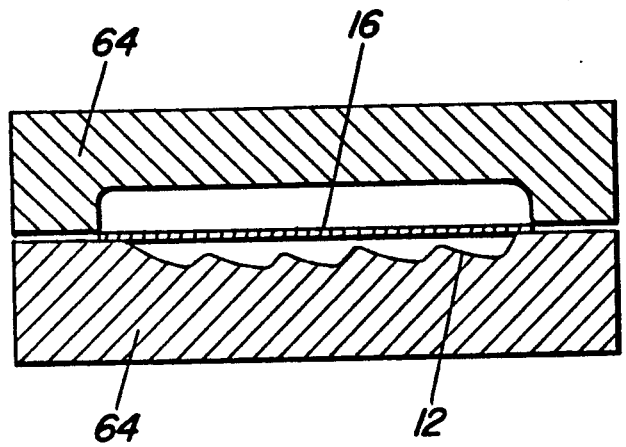
FIGS. 7 and 8 are cross-sectional views of an injection mold for manufacturing this warning reflector.
Figure 8:
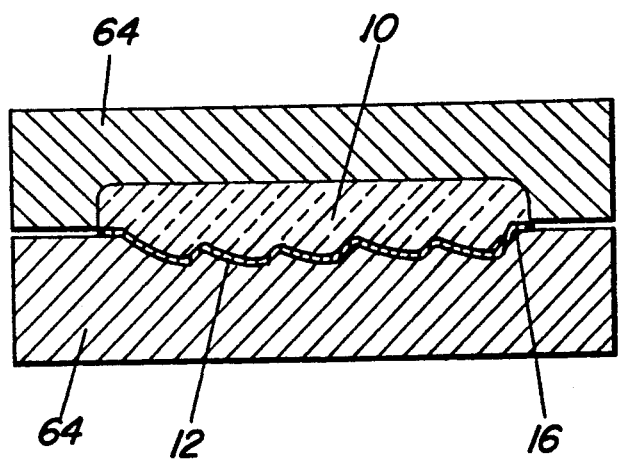

A preferred method of manufacturing the plates is illustrated in FIGS. 7 and 8. A reflective metal foil 16, e.g., an aluminum foil, which may be coated with transparent plastic to reduce oxidation, is introduced into an injection mold 64. This is shown schematically in FIG. 7. Then the clear or colored transparent plastic for forming the plate 10 is introduced into the injection mold. This results in the foil 16 conforming to the toric surfaces 12 at an elevated temperature. The formed plate 10 is shown in FIG. 8. Using this method of manufacture, a reflector plate is obtained in which the formed metal foil is completely surrounded and bonded by plastic.

SUMMARY, RAMIFICATIONS, AND SCOPE

The foregoing has made apparent a number of modifications of the previous reflectors and how they are installed which are part of the invention disclosed. This invention, therefore, is to be limited only by the scope of the appended claims.

I claim:

1. The method of installing a plurality of warning reflectors, each reflector comprising a transparent plastic plate having a flat light entrance surface and a backside reflective surface from which the reflected light is dispersed, the improvement comprising said reflective surface being formed from a set of identical toric surfaces situated side-by-side vertically and horizontally, including having the optical axis of each of the toric surfaces at an angle of approximately 8° with the perpendicular to the light entrance surface, having the radius of curvature of the toric surfaces approximately 7 cm, where each toric surface has dimensions of approximately 1.3 × 1.3 cm, each reflector device dispersing light equally in vertical and horizontal directions thereby being visible over large areas of varied terrain contours, said method comprising the steps of:

(a) positioning said reflectors at equal intervals in a line along each side of the highway so that each reflector reflects light across the highway; and (b) staggering said reflectors such that each reflector on a first side of the highway is located and centered between reflected light areas of two reflectors on the other side of the highway to provide complete reflective light coverage of both the highway area and the roadsides.

2. The method of claim 1 for installing the warning reflectors including the additional step of locating all reflectors in a plane at average vehicle headlight height parallel with the highway whether the roadway is level or banked.

3. The method of claim 2 for installing the warning reflectors with the reflectors located on each side of the highway including the additional step of spacing reflectors within each line at intervals equal to the distance between the lines of reflectors.

4. The method of claim 3 for installing the warning reflectors including the additional step of adding reflectors directing light away from the highway and positioning the additional reflectors back to back with the reflectors which are directing light across the highway at or near a shoulder break in areas of roadside fills to provide coverage of down slope embankments.

* * * * *